United States Patent
Granhed et al.

(10) Patent No.: US 12,032,052 B2
(45) Date of Patent: Jul. 9, 2024

(54) EMERGENCY RESCUE EQUIPMENT COMPRISING A HARMONIC REFLECTOR CIRCUIT

(71) Applicant: Recco Invest AB, Lidingö (SE)

(72) Inventors: Magnus Granhed, Lidingö (SE); Tomas Forssén, Västerås (SE)

(73) Assignee: Recco Invest AB, Lidingö (SE)

( * ) Notice: Subject to any disclaimer, the term of this patent is extended or adjusted under 35 U.S.C. 154(b) by 429 days.

(21) Appl. No.: 17/414,699

(22) PCT Filed: Dec. 17, 2019

(86) PCT No.: PCT/SE2019/051288
§ 371 (c)(1),
(2) Date: Jun. 16, 2021

(87) PCT Pub. No.: WO2020/130913
PCT Pub. Date: Jun. 25, 2020

(65) Prior Publication Data
US 2022/0075046 A1    Mar. 10, 2022

(30) Foreign Application Priority Data
Dec. 21, 2018 (SE) .................... 1851646-8

(51) Int. Cl.
*G01S 13/34* (2006.01)
*G01S 13/75* (2006.01)
(Continued)

(52) U.S. Cl.
CPC ............ *G01S 13/34* (2013.01); *G01S 13/753* (2013.01); *G08B 25/016* (2013.01); *H01Q 1/241* (2013.01); *H01Q 1/273* (2013.01)

(58) Field of Classification Search
None
See application file for complete search history.

(56) References Cited

U.S. PATENT DOCUMENTS 3,911,434 A * 10/1975 Cook ..................... G08C 19/12
340/447
4,331,957 A   5/1982 Enander et al.
(Continued)

FOREIGN PATENT DOCUMENTS

CN    1159687 A    9/1997
CN    1903132 A    1/2007
(Continued)

OTHER PUBLICATIONS

Kimmo Rasilainen et al., "Effect of Shape and Surroundings on Harmonic Transponder Performance," 2016 10th European Conference on Antennas and Propagation (EUCAP), European Association of Antennas and Propagation, Apr. 10, 2016, pp. 1-5.
(Continued)

*Primary Examiner* — Bernarr E Gregory
(74) *Attorney, Agent, or Firm* — Capitol City TechLaw

(57) ABSTRACT

An emergency rescue equipment having a harmonic reflector circuit comprising an antenna connected to a non-linear circuit via a matching circuit and a casing that in part enclose the harmonic reflector circuit, wherein the harmonic reflector circuit is configured to receive a signal at a receive frequency (fRX), and configured to transmit said received signal at a transmit frequency (fTX), where the transmit frequency is a multiple of the receive frequency, the harmonic reflector circuit wherein the receive frequency (fRX) is in an interval from a first frequency to a second frequency, where the first frequency is at least 800 MHz; and the second frequency is at least 34 MHz larger than the first frequency; the received signal is transmitted at the transmit frequency (fTX) with an output power (Pout) of at least 70% of the maximum available output power (Pmax).

16 Claims, 3 Drawing Sheets

(51) Int. Cl.
  *G08B 25/01* (2006.01)
  *H01Q 1/24* (2006.01)
  *H01Q 1/27* (2006.01)

(56) References Cited

U.S. PATENT DOCUMENTS

| | | | |
|---|---|---|---|
| 4,646,090 A * | 2/1987 | Mawhinney | G08B 13/2448 342/44 |
| 4,656,478 A * | 4/1987 | Leuenberger | G06K 19/07786 342/51 |
| 5,606,323 A * | 2/1997 | Heinrich | G06K 19/0723 340/10.34 |
| 6,060,815 A | 5/2000 | Nysen | |
| 6,456,228 B1 | 9/2002 | Granhed et al. | |
| 2005/0151662 A1 | 7/2005 | Kashuba et al. | |
| 2009/0272814 A1 | 11/2009 | Granhed et al. | |
| 2009/0314423 A1 | 12/2009 | Savarese et al. | |
| 2013/0130843 A1 | 5/2013 | Burroughs et al. | |
| 2013/0187712 A1 | 7/2013 | Cabanillas et al. | |
| 2013/0194100 A1 | 8/2013 | Granhed et al. | |
| 2016/0282457 A1 | 9/2016 | Mazzaro et al. | |
| 2017/0033591 A1 | 2/2017 | Govindaraj et al. | |
| 2018/0048162 A1 | 2/2018 | Von Novak et al. | |

FOREIGN PATENT DOCUMENTS

| | | | | |
|---|---|---|---|---|
| CN | 103840769 A | | 6/2014 | |
| CN | 104568060 A | | 4/2015 | |
| CN | 106918804 A | | 7/2017 | |
| CN | 206450823 U | | 8/2017 | |
| CN | 107340269 A | | 11/2017 | |
| CN | 108028541 A | | 5/2018 | |
| CN | 108321552 A | | 7/2018 | |
| CN | 108333564 A | | 7/2018 | |
| EP | 1035418 B1 | | 7/2005 | |
| EP | 2907551 A1 | | 8/2015 | |
| EP | 3222167 A1 | | 9/2017 | |
| GB | 2312112 A | | 10/1997 | |
| GB | 2337422 A | * | 11/1999 | G01S 13/751 |
| JP | 2006-513594 A | | 4/2006 | |
| JP | 2006-518247 A | | 8/2006 | |
| JP | 2011-082658 A | | 4/2011 | |
| JP | 2012-139493 A | | 7/2012 | |

OTHER PUBLICATIONS

Chen et al., "Analysis and Simulation of Nonlinear Target Detection by Dual-Frequency Harmonic Radar", Guidance and Fuze, No. 1, Mar. 30, 1996, pp. 27-33, China Academic Journal Electronic Publishing House.

Kimmo Rasilainen et al., "Antenna Matching at Harmonic Frequencies to Complex Load Impedance," IEEE Antennas and Wireless Propagation Letters, vol. 14, 2015, pp. 535-538.

* cited by examiner

FIG. 2 (Prior-Art)

_US 12,032,052 B2_

EMERGENCY RESCUE EQUIPMENT COMPRISING A HARMONIC REFLECTOR CIRCUIT

TECHNICAL FIELD

The present invention relates to an emergency rescue equipment having a radar reflector, and particularly to an emergency rescue equipment having a radar reflector for harmonic radar.

BACKGROUND

Emergency rescue equipment having harmonic radars have been used for a long time in search and rescue operations throughout the world. In a typical avalanche scenario, a skier is lost in an avalanche and a rescue team arrives shortly thereafter, the skier is equipped with an emergency rescue equipment having a reflector. The rescue team is equipped with a detector that transmits a signal with a transmit frequency. When the reflector on the skier receives this signal, the reflector converts the frequency of the signal to a multiple thereof and transmit the converted signal back to the detector. This means that the detector transmits on a first frequency and receives on a multiple of the first frequency, this information is then used to determine the position of the skier.

However, the tuning of the reflector in the emergency rescue equipment involves tuning the antenna for receiving on the first frequency and transmitting on a multiple of the first frequency. Furthermore, a conventional reflector uses a non-linear element such as a diode for resonance and the antenna needs to be matched to this element in order to provide sufficient power for the frequency conversion and retransmission of the converted signal. An example of a harmonic reflector is provided in U.S. Pat. No. 6,456,228B1. This patent provides a guideline for matching of the components of a harmonic reflector by means of transmission line sections.

Another example is disclosed in K. Rasilainen, J. Ilvonen and V. Viikari, "Antenna Matching at Harmonic Frequencies to Complex Load Impedance," in IEEE Antennas and Wireless Propagation Letters, vol. 14, no., pp. 535-538, 2015. doi: 10.1109/LAWP.2014.2370760.

According to prior art, such as disclosed above, the skilled person is mainly focused on providing a good efficiency in terms of reflected power at a single frequency.

If a conventional reflector is placed in emergency rescue equipment with different properties, a compromise must be made in order to minimize the impact of the object on the reflector. The conventional reflector is designed for a typical electromagnetic surrounding of the object. Therefore, a conventional reflector is designed to be mounted on objects with similar properties such as ski-boots or ski-helmets.

According to prior-art, such as EP1035418B1, the antenna is encapsulated in a dielectric, which solves the problem if a reflector is mounted inside a ski-boot or attached to the outside of the ski-boot.

However, the known solutions exhibit problems related to detection of objects with large differences in size and properties, due to the objects electromagnetic interaction with the reflector.

The present invention aims at solving that problem.

SUMMARY OF THE INVENTION

The above-mentioned problem is solved by means of an emergency rescue equipment having a harmonic radar reflector which reflects an incoming signal at a receive frequency at a transmit frequency being a multiple of the receive frequency, wherein the harmonic radar reflector is designed for a broadband response.

Prior-art harmonic reflectors provide narrow band response, this is due to the fact that prior-art harmonic reflectors are mainly tuned to minimize return-loss at the specific receive frequency which means that a large amount of incoming energy to the harmonic radar is transferred to the non-linear element. The harmonic reflector may be tuned for a narrow band response; this further implies that the prior-art harmonic reflector is sensitive for electromagnetic interaction with the object it is attached to.

Prior-art harmonic reflectors are designed to maximize performance for a single constant environment. When the reflector is placed in an environment with different properties the performance will be degrade. This is mainly due to that the change in the electromagnetic properties result in different antenna impedance, resulting in a poor impedance match between the reflector antenna and the non-linear element.

The present invention provides an emergency rescue equipment having a harmonic reflector circuit comprising an antenna connected to a non-linear circuit via a matching circuit and a casing that full or in part encloses the harmonic reflector circuit, wherein the harmonic reflector circuit is configured to receive a signal at a receive frequency (fRX), and configured to re-transmit said received signal at a transmit frequency (fTX), where the transmit frequency is a multiple of the receive frequency, wherein the receive frequency (fRX) is in an interval from a first frequency to a second frequency, where: the first frequency is at least 800 MHz; and the second frequency is at least 34 MHz higher than the first frequency; the received signal is transmitted at the transmit frequency (fTX) with an output power (Pout) of at least 70% of the maximum available output power (Pmax) for a frequency in the transmit frequency range from the multiple of the first frequency to the same multiple of the second frequency. This allows detection of objects with large differences in material and size, due to the broadband behaviour of the harmonic reflector circuit. Using an emergency rescue equipment in an environment with varied electromagnetic properties may degrades the performance. This degradation is due to the change in the electromagnetic properties result in different antenna impedance, resulting in a poor impedance match between the reflector antenna and the non-linear element. For example, such varied electromagnetic properties may for example be by enclosing the harmonic reflector circuit in casings of different materials, by having different material between the harmonic reflector circuit and the signal that is transmitted by the rescue team or by different humidity's. By utilizing a harmonic reflector circuit with a broadband behaviour, the emergency rescue equipment may be detected in in a wide span of surroundings where prior art equipment tuned for a specific receive frequencies would be vulnerable. For example, by utilizing a harmonic reflector circuit with a broadband behaviour, the emergency rescue equipment would be more robust and be functional in more numerous types of casings and situations. Thereby the safety of the user can be increased.

According to an aspect, the first frequency is 860.5 MHz and the second frequency may be 909.5 MHz.

According to an aspect, the maximum available output power (Pmax) may be at least 0.1% of the incoming radiated power at the antenna.

According to an aspect, the maximum available output power (Pmax) may be at least 0.01% of the incoming radiated power at the antenna.

According to an aspect, the maximum available output power (Pmax) may be at least 0.001% of the incoming radiated power at the antenna.

According to an aspect, the maximum available output power (Pmax) may be at least 0.0001% of the incoming radiated power at the antenna.

According to an aspect, the transmit frequency fTX may be the double receive frequency fRX.

According to an aspect, the harmonic reflector may comprise a substrate with a metal film.

According to an aspect, the harmonic reflector may comprise a flexible substrate with a metal film.

According to an aspect, the antenna and parts of the matching circuit may be formed in the metal film.

According to an aspect, the harmonic reflector may comprise a diode as the non-linear element.

According to an aspect, the casing may comprise a material having a dielectric constant in the range of 1.6 and 15.

According to an aspect, the casing may comprise a material having a dielectric constant in the range of 1.6 and 4. This may for example be different plastic materials, such as polyurethane foam, PVC, Bakelite, polystyrene, polyvinyl, nylon and/or rubber.

According to an aspect, the casing may comprise a material having a dielectric constant in the range of 3.8 and 14.5. This may for example be different glass materials, such as silicate glass, fused quartz, soda-lime-silica glass, sodium borosilicate glass, lead oxide glass, aluminosilicate glass and/or germanium oxide glass.

According to an aspect, the casing may comprise a material having a dielectric constant in the range of 80 and 81. This may for example be water in different states and with different additives.

According to an aspect, the casing may comprise a material having a dielectric constant in the range of 1 and 1.0006. This may for example be vacuum or air in different states or pressures and with different additives.

According to an aspect, the casing may comprise a material that shifts the operating frequency range of the harmonic reflector circuit.

According to an aspect, the operating frequency range of the harmonic reflector may be between the first frequency and the second frequency.

According to an aspect, the operating frequency range of the harmonic reflector may be the span of frequencies between the first frequency and the second frequency.

According to an aspect, the operating frequency range may be shifted by at least partially covering the emergency rescue equipment in a liquid.

According to an aspect, the casing may have a first and a second state, in which the operating frequency range is shifted in the second state in comparison to the first state.

According to an aspect, the casing may comprise a material having a first dielectric constant in a first state and a second dielectric constant in a second state, in which the operating frequency range is shifted in the second state in comparison to the first state; wherein the first state is being dry and the second state is being wet.

According to an aspect, the casing may be made of leather. For example, the casing may be or be a part of a wearable, clothing or a tag. For example, the casing may be a belt, boots, shoes, a bracelet, other wearables, a pendant or similar.

According to an aspect, the casing may be made of fabric. For example, the casing may be or be a part of a wearable, clothing or a tag. For example a jacket, a ski jacket a wind jacket, trousers, a backpack or similar.

According to an aspect, the casing may be made of plastic. For example, the casing may be or be a part of a wearable, clothing or a tag.

According to an aspect, the casing may be a shoe. The harmonic reflector circuit may for example be mounted on the outside of the shoe or in an internal compartment. The harmonic reflector circuit may also be cast solid as a part of the shoe. The shoe may for example be a boot, a hiking shoe, a ski boot and/or an ordinary shoe.

According to an aspect, the casing may be a life jacket. The harmonic reflector circuit may for example be mounted on the outside of the life jacket or in an internal compartment. The harmonic reflector circuit may also be cast solid as a part of the life jacket. The life jacket may be inflatable or solid.

According to an aspect, the casing may be a bracelet. The harmonic reflector circuit may for example be mounted on the outside of the bracelet or in an internal compartment.

Further features and advantages of the present invention will be presented in the following detailed description of exemplifying embodiments of the invention with reference to the annexed drawing.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 2 is a graph illustrating the reflected power from a prior-art harmonic reflector, FIG. 3 is a schematic drawing of a prior-art harmonic reflector circuit interacting with the object it is attached to.

DETAILED DESCRIPTION OF EXEMPLIFYING EMBODIMENTS

Figure 1:
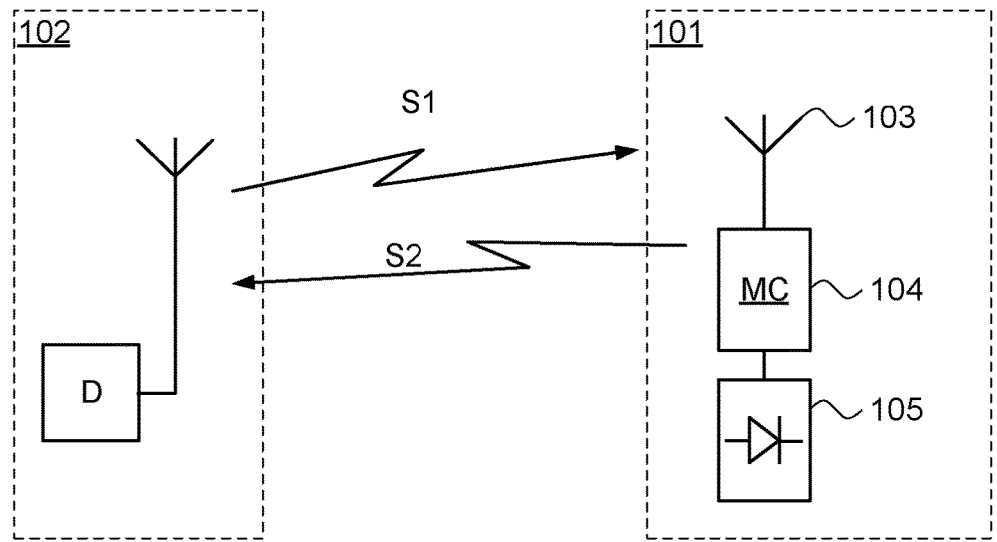
FIG. 1 is a schematic drawing of a detector and a harmonic reflector circuit.

FIG. 1 shows a harmonic reflector circuit, generally designated 101, and a detector, generally designated 102.

The detector 102 transmits a signal S1 at a frequency fRX this signal S1 is received by the harmonic reflector circuit 101 and converted and transmitted as a second signal S2 at a frequency fTX by the harmonic reflector circuit 101. The harmonic reflector circuit 101 receives the incoming signal S1 by means of an antenna 103. The antenna 103 is connected to a matching circuit 104 which provides an impedance match between the antenna 103 and the non-linear circuit 105 for both the frequency fRX and the frequency fTX. The impedance matching is crucial for a conversion with low losses from the first signal S1 to the second signal S2, at their frequency fRX and fTX, respectively.

In FIG. 2 a typical response from the harmonic reflector 102 is disclosed. A first curve 201 shows the reflected power P from a signal transmitted at frequency fc, the bandwidth of the curve 201 depends on the impedance matching between the non-linear circuit 105 and the antenna 103, and of course the bandwidth of the antenna 103 and the non-linear circuit 105, themselves.

Figure 3:
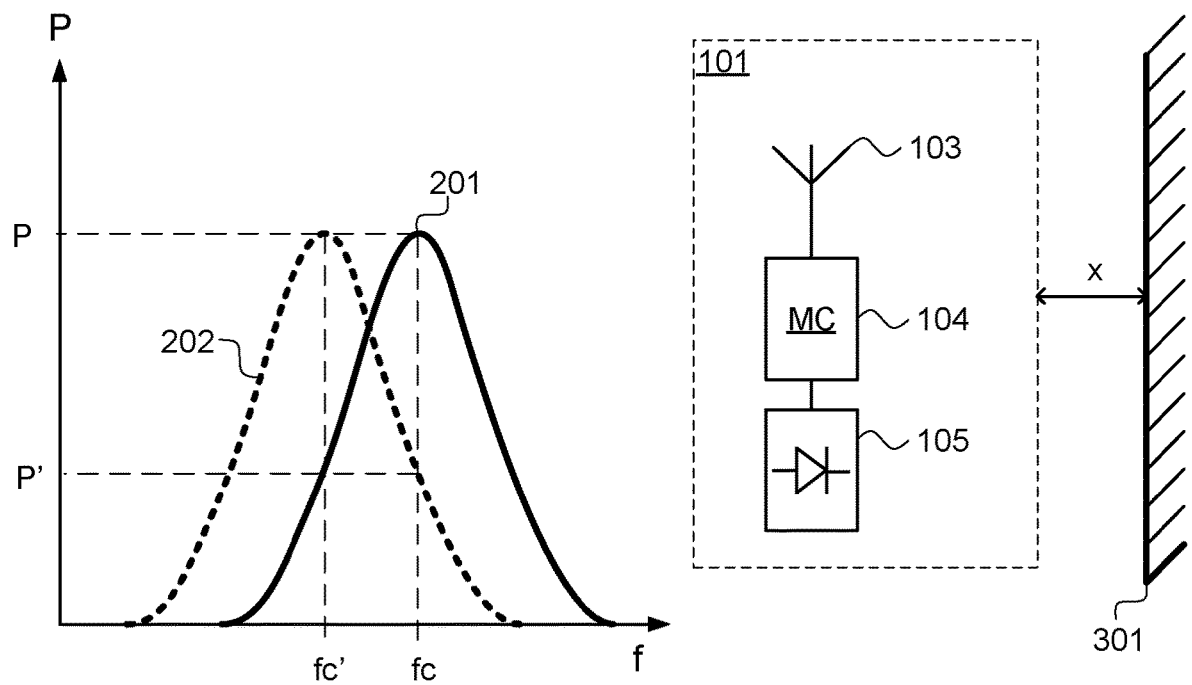

In FIG. 3 the harmonic reflector circuit 101 is shown together with a ground plane 301. The ground plane 301 may be a physical object, such as a helmet or a human. The ground plane 301 causes a dielectric coupling to the harmonic reflector circuit 101 which changes the properties of the matching circuit 104. This means that the reflected power at frequency fc decreases from P to P' on corresponding curve 202. In a prior-art harmonic reflector circuit 101 the matching circuit is configured to provide matching for a predetermined ground plane at a predetermined distance and a predetermined dielectric environment. For example the harmonic reflector circuit 101 is dimensioned for mounting on a ski boot or a helmet i.e. ground planes of the same order of magnitude and similar dielectric properties. This means that a conventional harmonic reflector circuit 101 mounted on a pair of glasses or mounted on a container will provide very different responses in terms of reflected power P, partly due to the large differences of the ground planes and dielectric properties of the surroundings.

The present inventors have realized that the problem of varying properties of the ground plane and dielectric properties are main contributors related to the problem of detecting harmonic radar reflections from objects of various properties.

Figure 4:
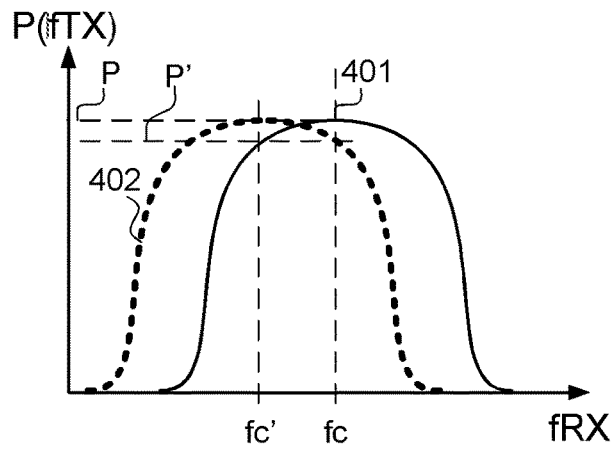
FIG. 4 is a schematic drawing of a harmonic reflector circuit according to an embodiment of the present invention together with a detector.

The present inventors have realized that a solution to the above problem related to harmonic radar reflections from objects of varying properties, is provided by increasing the bandwidth of the harmonic reflector circuit 101. This can be understood by studying FIG. 4 in which the reflected harmonic power P is shown as a function of frequency f. The first curve 401 illustrates the reflected harmonic power around the center frequency fc, this first curve provides a larger bandwidth compared to the prior-art curve 201. Assume that a ground plane 301 is placed such that the coupling from the ground plane to the harmonic reflector circuit 101 causes a shift of the first curve 401 to a second curve 402 with a center frequency fc'. The y-axis of FIG. 4 discloses the reflected power at a multiple of the frequency fRX, which is the frequency fTX. The x-axis shows the receive frequency fRX. The reflected power P decreases to P', which is much less than the decrease shown in FIG. 2. This means that the reflected power P is not significantly affected by the ground plane 301.

Figure 5:
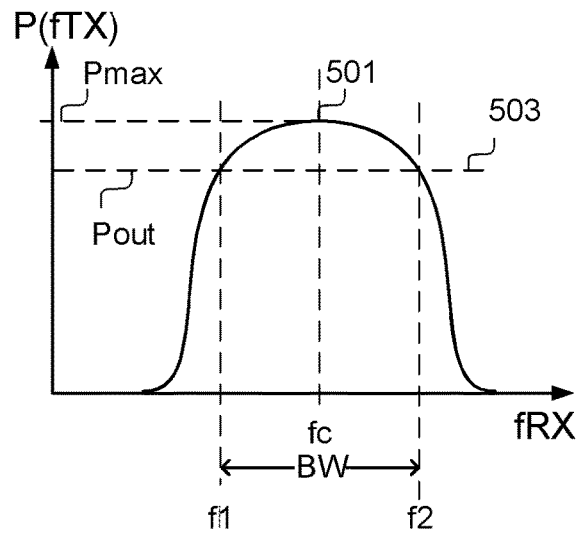
FIG. 5 is a graph illustrating the response provided by the harmonic reflector according to an embodiment of the present invention.

In FIG. 5 the reflected power P at the transmit frequency fTX is shown as a function of the receive frequency fRX from a harmonic reflector circuit 101 according to the present invention. The receive frequency (fRX) is in an interval from a first frequency f1 to a second frequency f2, where the first frequency f1 is at least 800 MHz. The second frequency f2 is at least 34 MHz larger than the first frequency. The received signal is transmitted at the transmit frequency (fTX) with an output power (Pout) of at least 70% of the maximum available output power (Pmax) for a defined electromagnetic environment.

In one embodiment, the first frequency is 860.5 MHz and the second frequency is 909.5 MHz.

Figure 6:
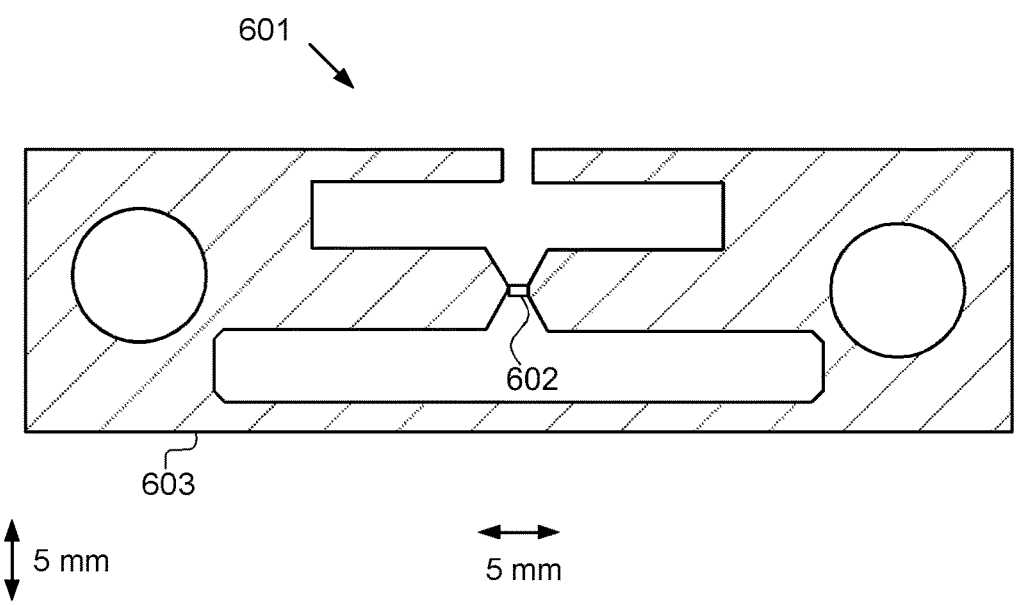
FIG. 6 is an embodiment of a harmonic reflector circuit according to an embodiment of the present invention.

In FIG. 6 an embodiment of a harmonic reflector circuit, generally designated 601, is drawn to scale in a top view. This harmonic reflector circuit 601 comprises a non-linear circuit which in this embodiment is a surface mounted diode 602 soldered to a metal film 603 of a substrate. The antenna and the matching circuit are integrally formed in the metal film 603 of the substrate. The harmonic reflector circuit 601 is drawn to scale, which means that by measuring and scaling the drawing a broadband harmonic reflector circuit 601 is achieved.

Figure 7:
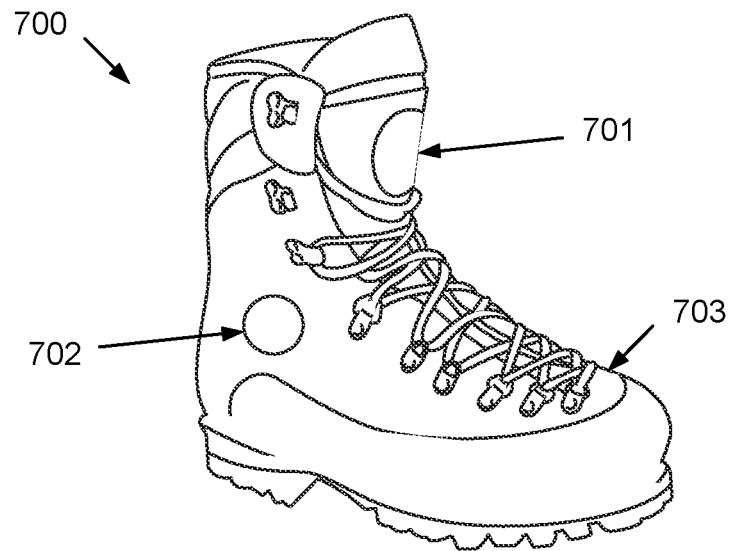
FIG. 7 is an embodiment of an emergency rescue equipment having a harmonic reflector circuit according to an embodiment of the present invention.

In FIG. 7 an embodiment of an emergency rescue equipment having a harmonic reflector circuit is shown. In the illustrated embodiment, the emergency rescue equipment 700 has two harmonic reflector circuits 701 and 702 that is enclosed by a casing 703 that is in the shape of a hiking boot. The emergency rescue equipment 700 may alternatively have a single harmonic reflector circuit or multiple harmonic reflector units. The harmonic reflector units may for example be located in the tongue of the hiking boot as the harmonic reflector unit 701 and/or in the quarter of the hiking boot as the harmonic reflector unit 702. The harmonic reflector unit may also be located in other parts of the hiking boot or a shoe, such as the lining, the backstay, the heel, the sole, the vamp, the toe box, the counter and/or similar.

Figure 8:
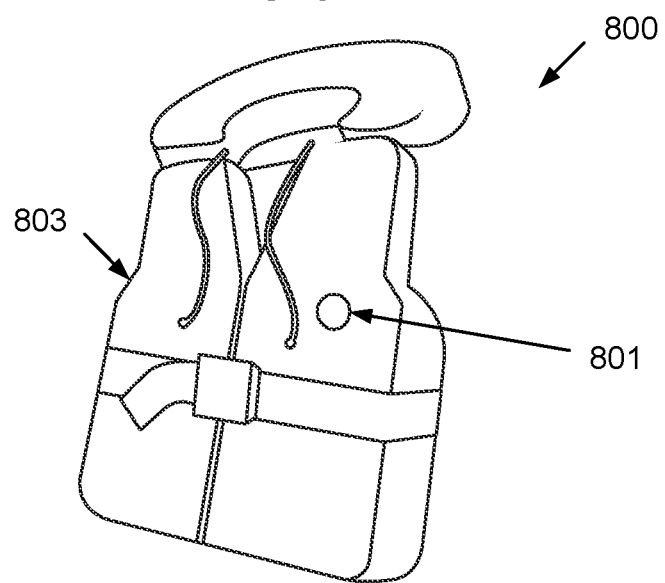
FIG. 8 is an embodiment of an emergency rescue equipment having a harmonic reflector circuit according to an embodiment of the present invention.

In FIG. 8 an embodiment of an emergency rescue equipment having a harmonic reflector circuit is shown. In the illustrated embodiment, the emergency rescue equipment 800 has a harmonic reflector circuit 801 that is enclosed by a casing 803 that is in the shape of a life jacket.

The invention claimed is:

1. An emergency rescue equipment comprising:
    a harmonic reflector circuit having an antenna connected to non-linear circuit via a matching circuit; and
    a casing that in full or in part encloses the harmonic reflector circuit;
    wherein the harmonic reflector circuit is configured to receive a received signal at a receive frequency (fRX), and configured to re-transmit the received signal at a transmit frequency (fTX);
    wherein the transmit frequency is a multiple of the receive frequency;
    wherein the receive frequency (fRX) is in an interval from a first frequency to a second frequency, where:
        the first frequency is at least 800 MHz and within the radio-frequency range;
        the second frequency is at least 34 MHz higher than the first frequency and within the radio-frequency range; and
        the received signal is re-transmitted at the transmit frequency (fTX) with an output power (Pout) of 70%-100% of a maximum available output power (Pmax).

2. An emergency rescue equipment according to claim 1, wherein the first frequency is 860.5 MHz and the second frequency is 909.5 MHz.

3. An emergency rescue equipment according to claim 1, wherein the maximum available output power (Pmax) is at least 0.1% of an incoming radiated power at the antenna.

4. An emergency rescue equipment according to claim 1, wherein the transmit frequency is double the receive frequency.

5. An emergency rescue equipment according to claim 1, comprising a substrate with a metal film.

6. An emergency rescue equipment according to claim 5, wherein the antenna and parts of the matching circuit are formed in the metal film.

7. An emergency rescue equipment according to claim 5, wherein the non-linear circuit is a diode.

8. An emergency rescue equipment according to claim 1, wherein the casing comprises a material having a dielectric constant in the range of 1.6 and 15.

9. An emergency rescue equipment according to claim 1, wherein the casing comprises a material that shifts an operating frequency range of the harmonic reflector circuit.

10. An emergency rescue equipment according claim 1, wherein an operating frequency range is shifted by at least partially covering the emergency rescue equipment in a liquid.

11. An emergency rescue equipment according to claim 1, wherein the casing has a first state and a second state, in which an operating frequency range is shifted in the second state in comparison to the first state.

12. An emergency rescue equipment according to claim 1, wherein the casing comprises a material having a first dielectric constant in a first state and a second dielectric constant in a second state, in which an operating frequency range is shifted in the second state in comparison to the first state; and
wherein the first state is being dry and the second state is being wet.

13. An emergency rescue equipment according to claim 1, wherein the casing is made of leather.

14. An emergency rescue equipment according to claim 1, wherein the casing is made of fabric.

15. An emergency rescue equipment according to claim 1, wherein the casing is made of plastic.

16. An emergency rescue equipment according to claim 1, wherein the casing is a shoe.

* * * * *